Figure 1:
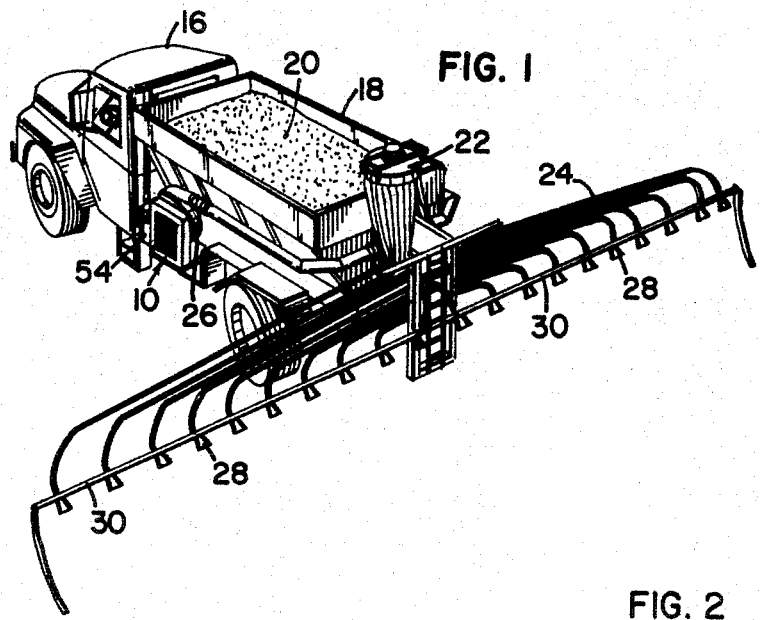
Figure 2:
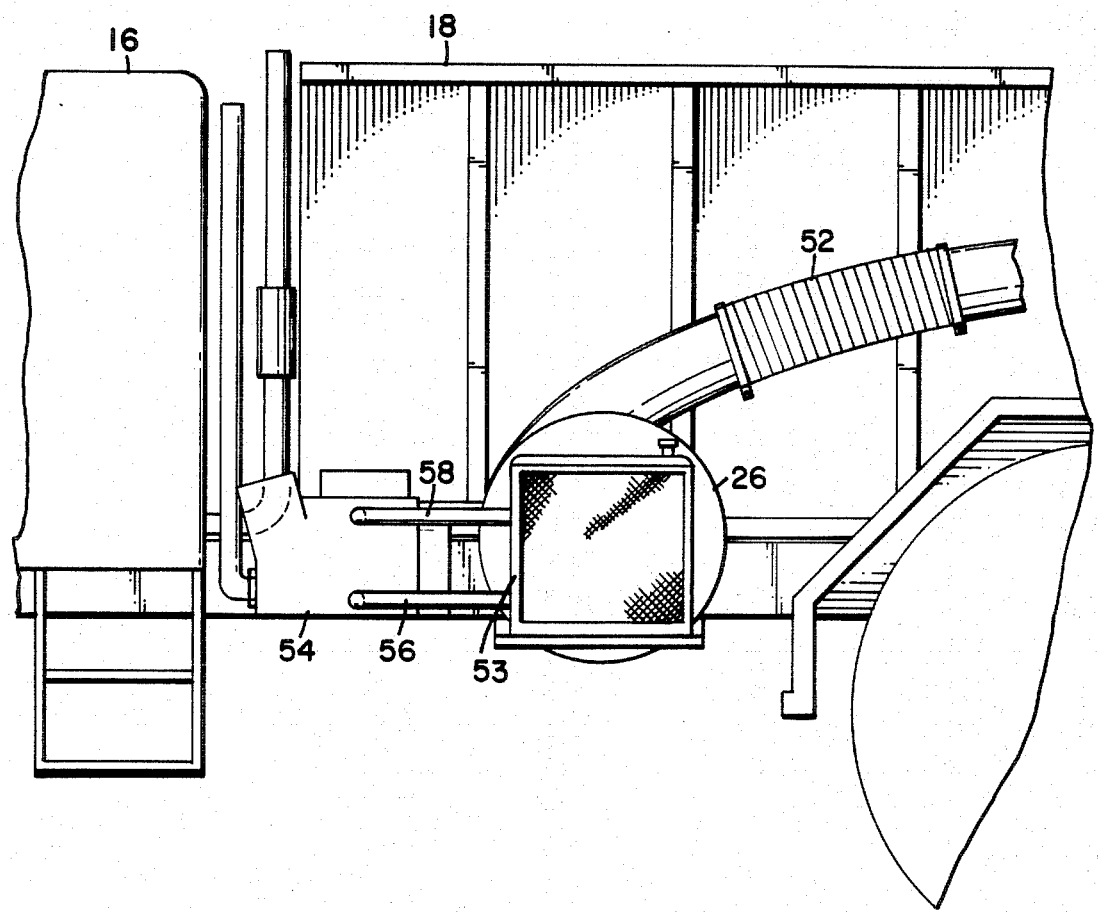

United States Patent [19]

Tyler

[11] Patent Number: 4,529,104
[45] Date of Patent: Jul. 16, 1985

[54] APPARATUS AND METHOD FOR HEATING AND USING AIR IN PNEUMATIC CONVEYOR IMPLEMENT

[75] Inventor: Loren E. Tyler, Benson, Minn.
[73] Assignee: Lor-Al Corporation, Benson, Minn.
[21] Appl. No.: 504,881
[22] Filed: Jun. 16, 1983

Related U.S. Application Data

[63] Continuation-in-part of Ser. No. 456,598, Jan. 10, 1983, abandoned.

[51] Int. Cl.³ ............................................. B67D 5/62
[52] U.S. Cl. ................................. 222/146.2; 222/627; 222/630; 239/130
[58] Field of Search ..................... 222/57, 146.1, 146.2, 222/146.5, 608, 610, 617, 626, 627, 630, 636, 637, 318; 239/130, 135, 654, 655

[56] References Cited

U.S. PATENT DOCUMENTS

| | | | |
|---|---|---|---|
| 2,770,396 | 11/1956 | Vernig | 222/146.1 X |
| 3,446,399 | 5/1969 | Ross et al. | 222/146.1 X |
| 3,502,245 | 3/1970 | Hoffstetter | 222/627 X |
| 3,926,377 | 12/1975 | Johnson | 239/655 |

FOREIGN PATENT DOCUMENTS 1055875 1/1967 United Kingdom ............... 222/627

Primary Examiner—Joseph J. Rolla
Assistant Examiner—Michael S. Huppert
Attorney, Agent, or Firm—Merchant, Gould, Smith, Edell, Welter & Schmidt

[57] ABSTRACT

An apparatus for heating air for a pneumatic conveyor implement is disclosed. Air is heated in a variety of fashions including passing input air to fan (26) through radiator (53) of fan drive motor (54). Air is also heated by mixing it with the exhaust gases from exhaust pipes (66), (72) from the propulsion engine of vehicle 16 or the fan drive engine (54). The heated air enhances distribution uniformity of substance 20 at the outputs (28) of the implement.

6 Claims, 11 Drawing Figures

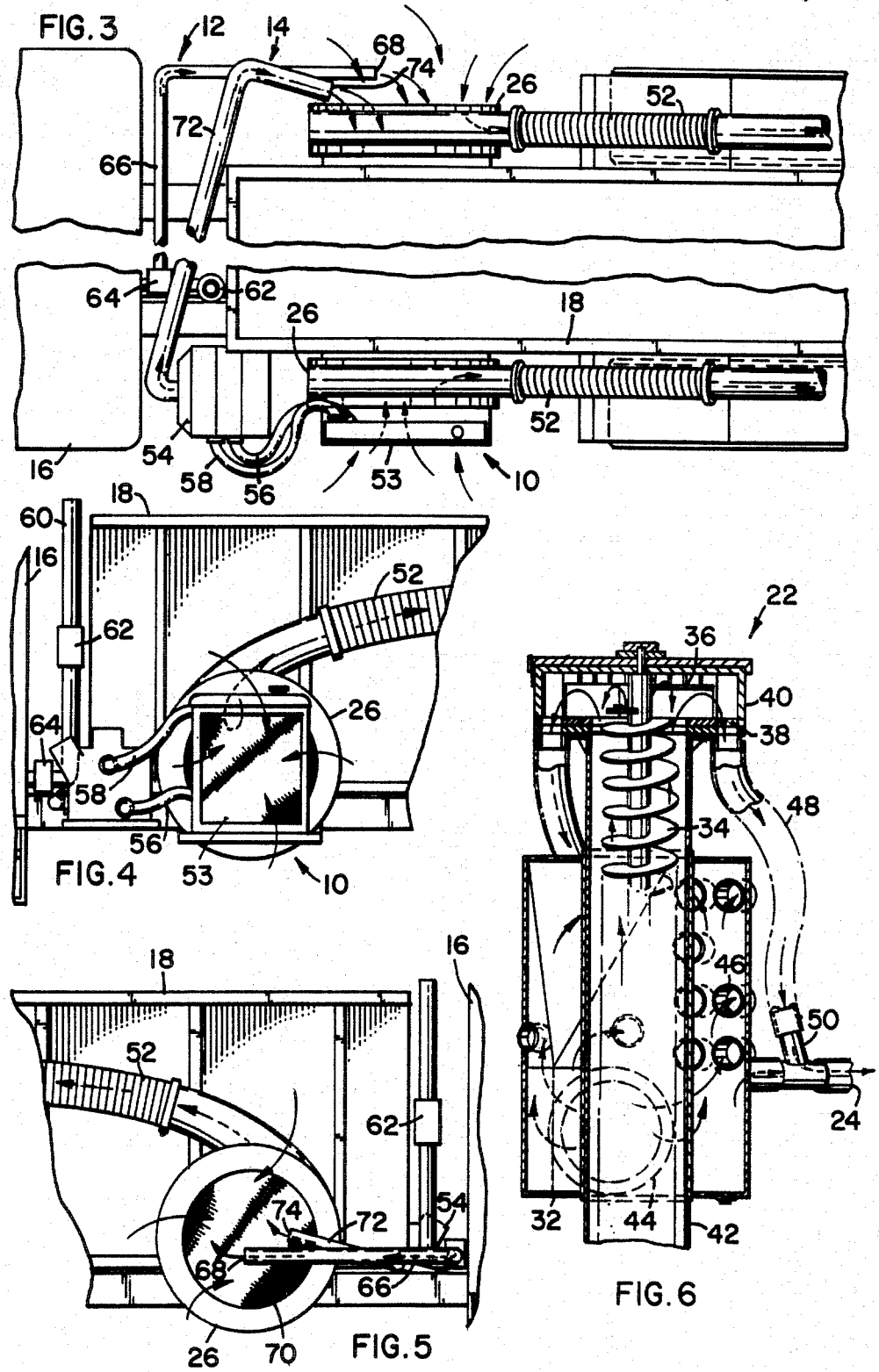

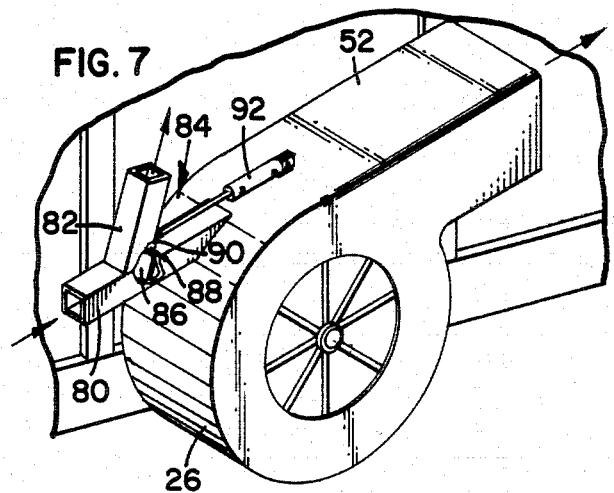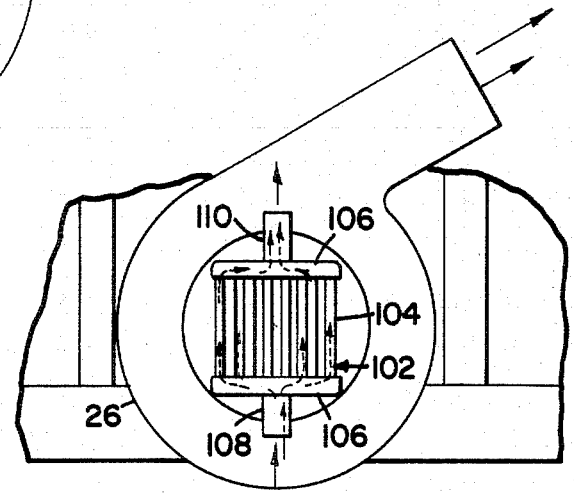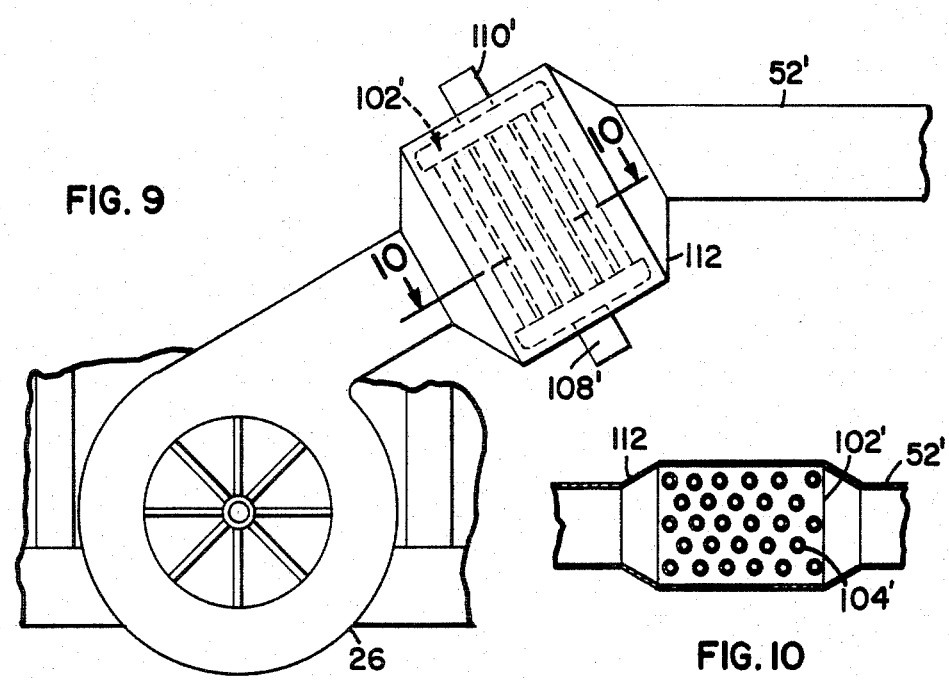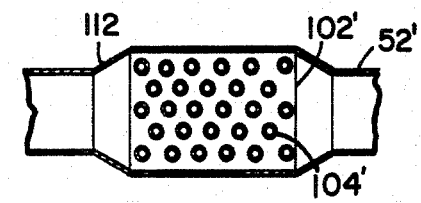

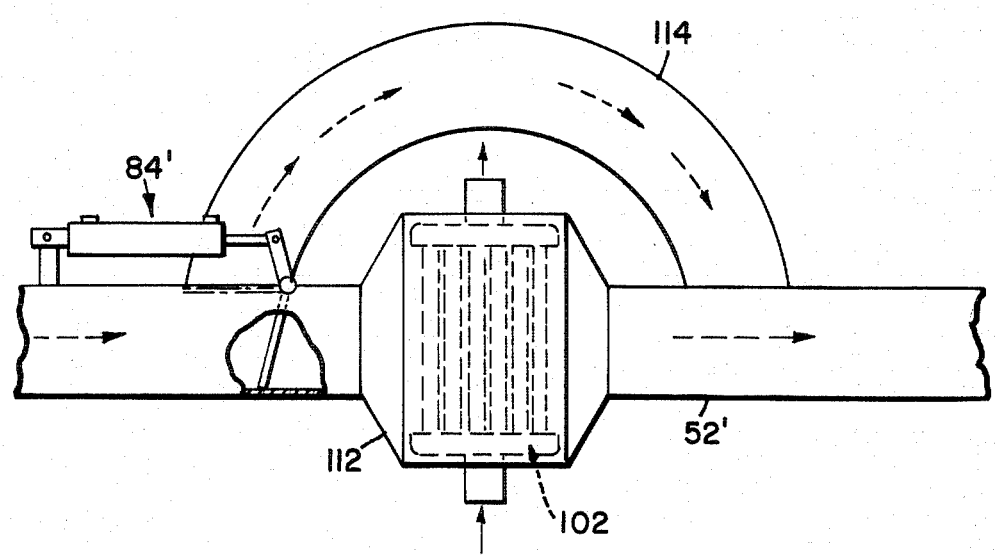

APPARATUS AND METHOD FOR HEATING AND USING AIR IN PNEUMATIC CONVEYOR IMPLEMENT

This is a continuation-in-part of Ser. No. 456,598, filed Jan. 10, 1982, now abandoned.

TECHNICAL FIELD

This invention relates to a farm implement which applies a dry substance such as a herbicide or a fertilizer to farmland. The apparatus makes use of waste heat from various systems to heat conveyancing air thereby helping to overcome problems of otherwise sticky application substances.

BACKGROUND OF THE INVENTION

Chemicals, fertilizers and other powdered or granulated substances are commonly applied to agricultural crops. Applicator implements for applying such substances commonly include a vehicle, usually self propelled, with a box and some type of distributing apparatus downstream from a box outlet. A spinner mechanism has been used for many years to simply throw the substances centrifugally outwardly from a location beneath the box outlet.

More recently, applicator implements for dry substances have used distributing apparatus with a pneumatic source for forcing the substance through a plurality of delivery channels spaced along the rear of the implement or along a boom supported by the implement. For example, U.S. Pat. No. 3,606,097 shows a blower for forcing conveyancing air through a distributing apparatus comprised of a plurality of channels leading to a fan like duct network. U.S. Pat. No. 3,926,377 shows a pair of fans which provide air to a centrifugal distributing device for conveyancing to a plurality of distribution tubes for output along arms extended from a vehicle.

Another exemplary implement is shown in U.S. patent application Ser. No. 288,675, filed July 31, 1981, which is assigned to the same assignee as the present application. The implement therein includes a blower for providing air generally downstream from the centrifugal distributing apparatus for pneumatically conveying the distributed substance through a plurality of tubes to outputs spaced along a boom.

None of the known devices includes mechanism for heating the conveyancing air. Although the latter implement operates well, substance could stick or be unevenly distributed if moisture is present. The implement includes a venturi restriction in the air system and it is known that air cools while going through the restriction, oftentimes causing condensation on surrounding parts. The present invention, therefore, is directed to using heated conveyancing air to reduce any condensation and eliminate or diminish the significance of other such problems, thereby providing dry conveyancing even in situations where such dry conveyancing performance may not otherwise be or have been possible.

SUMMARY OF THE INVENTION

The present invention is directed to a farm implement for applying a substance onto farmland. The implement includes a vehicle and a container carried by the vehicle for holding a bulk quantity of the substance. The implement further includes distributing mechanism having a fan wherein the fan receives intake air or gas and delivers pressurized air or gas. The distributing mechanism includes conveying mechanism allowing the pressurized air to move the substance along at least a portion of a path from the container to a distribution outlet. The implement also includes a heat source of some type, for example, an engine for driving the fan wherein the engine creates heat or an hydraulic system whereby the circulating fluid becomes hot. The implement finally includes mechanism for cooling the source of heat by transferring the heat to either the intake air or the pressurized air of the fan, thereby aiding substance conveyance.

The invention is also directed to the process of conveying a substance comprising the steps of moving the substance from a bulk container on the agricultural implement to distributing mechanism, heating a gaseous fluid like air, combining the heated air with substance from the distributing means, and forcing the air and substance combination through conveyance mechanism to an outlet.

In a more particular embodiment, the present invention includes using a radiator or the exhaust gases from an engine either directly or in conjunction with a heat exchanger, to heat the air which is used to force the conveyed substance through tubes to outputs. In one embodiment, the radiator of the fan drive engine is advantageously located directly in front of the input air duct to a fan. If there are two or more fans, the radiator heated air may combine with cooler air from a second fan in a downstream plenum chamber before the air enters the substance conveyancing tubes, or additional radiators may heat intake air to all fans.

In another embodiment, the exhaust of the fan drive engine is directed to an output location near the input duct of a fan. Thus, some of the exhaust gases are mixed with and become part of the pressurized conveyancing gas. In a variation on this embodiment, the exhaust from the engine of the self propelled vehicle may also be output at a location near the input duct of a fan. In another variation, hot exhaust gases may be directed directly into the output ducting of one or more fans. Or, exhaust gases may be directed into a heat exchanger placed either in front of the intake fan or in the output ducting downstream from the fan.

In still another embodiment, an hydraulic system drives the fan or fans and one or more radiators is placed in one or more of the above indicated locations to cool the circulating hydraulic fluid.

The present invention advantageously improves pneumatic conveyancing of substances for distribution onto a farm field. Oftentimes, bulk substances contain or absorb moisture, which may not make pneumatic conveyancing impossible, but can decrease distribution uniformity and lead to sticking. The possibility of condensation as discussed hereinbefore with respect to a known machine after conveyancing air passes through a venturi restriction is vastly reduced with the present invention. The hotter air of a machine in accordance with the present invention is not only not nearly as easily cooled to the dew point but also can hold much more moisture in an absolute sense. Furthermore, the hotter air actually leads to evaporation. Thus, the present invention significantly lowers the probability of performance decrease and rather is directed to insure consistent distribution uniformity under otherwise marginal or impossible operating conditions.

Even if there is no significant amount of moisture in the primary substances to be distributed, it is often desireable and common to impregnate or to mix a relatively small quantity of one or more liquid chemicals with the otherwise dry substance. Such combination may eliminate the need for a second trip across a field thereby resulting in substantial savings of time and energy. It is well known, for example, that chemicals which are mixed or impregnated with dry fertilizer are petroleum based. The fertilizer application industry is well aware of how sticky such oil based chemicals can be when brought into contact with cool surfaces. Such stickiness, however, disappears if the same surfaces are heated. That is, the oil based product in contact with the heated surface is much more viscous. The present invention, then, advantageously has the same result and, thus, reduces compacting or buildup on conveyance system parts. That is, the heated conveyancing air not only heats the substance to be spread, but also heats the physical parts of the system. Therefore, regions which otherwise were cool and susceptible to build-up are now warmer and much less likely to be subjected to substance sticking thereto.

These advantages and other objects obtained by the use of this invention are further explained and may be better understood by reference to the drawings which form a further part of this disclosure and to the descriptive matter hereinafter in which there is described in more detail a preferred embodiment of the invention.

BRIEF DESCRIPTION OF THE DRAWINGS

FIG. 1 is a perspective view of an agricultural implement exemplary of the type on which the present invention may be used;

FIG. 2 is a side view showing a radiator in front of the input duct of a fan in accordance with the present invention;

FIG. 3 is a top view of an implement on which preferred and other embodiments are incorporated;

FIG. 4 is a side view of the implement of FIG. 3 showing a radiator at the location of the input duct of a fan;

FIG. 5 is an opposite side view from that of FIG. 4 of the implement of FIG. 3 showing the outputs of exhaust pipes near the input duct of a fan;

FIG. 6 is a cross-sectional view of distributing apparatus typical of a type used with the present invention;

FIG. 7 is a perspective view of a fan showing a valve assembly and piping for directing exhaust gases into the fan output or to bypass same;

FIG. 8 shows an elevational view of a fan with a heat exchanger located in front of the input of the fan;

FIG. 9 shows an elevational view of a fan with a heat exchanger in phantom lines in the output ducting;

FIG. 10 shows a cross-sectional view of the heat exchanger taken along line 10—10 of FIG. 9; and FIG. 11 is a detailed side view of fan output ducting to include a heat exchanger in the main branch and a bypass branch with a valve assembly directing flow between the two branches.

DETAILED DESCRIPTION OF THE INVENTION

Referring now to the drawings wherein like reference numerals designate identical or corresponding parts throughout the several views, and more particularly to FIG. 3, various apparatus for heating pressurized conveyancing air in accordance with the present invention is designated generally as 10, 12, and 14. As shown in FIG. 1, apparatus 10 is used on an agricultural implement which includes a vehicle 16 having a containing box 18 for bulk substance 20. Substance 20 is moved to a distributing apparatus 22 for separation into a plurality of tubes 24. Fans 26 on both sides of vehicle 16 blow air to a central manifold or plenum chamber (see 32 in FIG. 6) for exit into the various conveyancing tubes 24 thereby entraining and forcing appropriate substance 18 to outputs or ejection devices 28 along boom 30.

An illustration of a typical distribution mechanism 22 and a plenum chamber 32 for distributing and combining substance 20 and heated air to convey substance 20 to outputs 28 is shown in FIG. 6. Briefly, substance 20 is moved from container 18 to an elevating auger 34. A centrifugally distributing panel 36 rotates with auger 34 to move substance 20 into a plurality of evenly spaced pockets 38 in housing 40. Plenum 32 is wrapped about sleeve 42 which surrounds auger 34. Pressurized air enters manifold or plenum chamber 32 at ports 44 shown in phantom lines. The air exits plenum 32 at a plurality of output openings 46. Substance falling through ports 38 continues to fall through connecting tubes 48 to enter intersections 50 for entrainment in the pressurized air and conveyance through distribution tubes 24. Although distribution mechanism 22 and chamber 32 were discussed in some detail hereinabove, it is to be understood that the mechanism of FIG. 6 is illustrative and exemplary, and that other such mechanisms may perform as well and are considered to be equivalent within the full meaning of the claims.

In FIG. 2, a vehicle 16 is shown with a container 18. A fan 26, attached in a commonly known fashion to either the frame of vehicle 16 or to container 18, provides pressurized air through tube 52 to a plenum chamber, such as 32 of FIG. 6. Fan 26 is driven by motor or engine 54 or by some other mechanism such as an hydraulic system. Gears, pulleys or other commonly known mechanism provide drive linkage between motor 54 and fan 26. If there is a fan 26 on both sides of container 18, then appropriate linkage causes engine 54 to drive both fans 26. Radiator 53, as seen also in FIG. 3, is located and attached as appropriate directly in front of and adjacent to the input opening or ducting of fan 26. Engine 24 is water cooled, and as the circulating water absorbs waste heat energy of the engine, it is circulated through hoses 56 and 58 to radiator 53. In this fashion, ambient air is drawn through radiator 53 to provide cooling for the water. At the same time, the ambient air is heated as it is drawn into fan 26. The heated air is then advantageously blown into the distribution system for entrainment and distribution of the substance to be spread. In the case of an hydraulic drive system, radiator 53 may be a heat exchanger providing for air cooling of the circulating hydraulic fluid. Similarly, FIG. 8 shows a heat exchanger 102 in front of and adjacent to fan 26. Similar to FIG. 10, heat exchanger 102 has a plurality of parallel tubes 104 with common chambers 106 at each end for connection to pipes 108 and 110. Hot exhaust gases from one or more engines are directed through heat exchanger 102. Ambient air is then heated as it passes through heat exchanger 102 to fan 26.

As shown in FIGS. 3–5, the propulsion engine for vehicle 16 has an exhaust pipe 60. Exhaust pipe 60, includes an appropriate muffler 62. As alternate mechanism for heating the pressurized air for conveying substance 20, exhaust pipe 60 may be fitted with a valve like device 64 for directing exhaust gases through either exhaust pipe 60 or an axillary pipe 66 having an output 68 adjacent to the input opening of duct 70 of one of fans 26.

In a similar fashion, the exhaust of engine 54, which drives fans 26, may be directed by a pipe 72 to an output 74 near input opening 70 of one of fans 26. Although not shown in the drawings, exhaust pipe 72 may also include a valve like device, like 64, for directing exhaust gases upwardly through a different discharge pipe having an opening located away from fans 26. In this regard, it is to be understood that the various pipes and routings of the pipes are illustrated quite generally and are intended simply to show a physical embodiment of the concept addressed by the present invention.

An alternate way of directing heated exhaust gases into the conveyancing air is to directly connect an exhaust pipe 80 to air tube 52 as shown in FIG. 7. In such embodiment, it is preferable to include a bypass pipe 82 with a valve assembly 84 for directing heated exhaust gases into tube 52 or out bypass pipe 82. Valve assembly 84 may be simply a flap 86 pivotable about an axis 88 by movement of an arm 90 with piston and cylinder assembly 92, wherein piston and cylinder assembly 92 may be actuated by the pressure created by fan 26. A torsion spring or linear spring (not shown) may be installed to bias the flapper 86 one way or the other when the fan is not operating.

Rather than mixing the heated exhaust gases with the conveyancing air as indicated by various embodiments hereinbefore, and rather than locating a radiator or heat exchanger in front of the input to fan 26, a further embodiment locates a heat exchanger 102' in an enlarged portion 112 of air tube 52' leading from fan 26. Heated exhaust gases are directed from pipe 108' into heat exchanger 102' and out pipe 110'. Pressurized air from fan 26 flows through heat exchanger 102' thereby heating the air before it reaches plenum chamber 32. As shown in FIG. 11, a bypass tube 114 with a valve assembly 84' may also be used.

In operation, engine 54 is started so as to drive fans 26 to blow air through the system. As air is drawn through radiator 53 or heat exchanger 102, it is heated and, when it arrives at plenum chamber 32, it is mixed with air from the other fan 26 if there is one. Substance thereafter comes entrained in the heated air and, consequently, flows easier than it otherwise might since there is less likely to be condensation and sticking.

In other embodiments, by operation of a valve mechanism, the exhaust gases from either the propulsion engine of vehicle 16 or the fan drive engine 54 may be directed directly into tube 52 downstream of fan 26 or directed for output in the vicinity of the input duct 70 of one of fans 26. The input air is either heated or mixed with the exhaust gases thereby carrying some of the heat energy to the pressurized side of the fan and then to plenum or manifold chamber 32 for mixing and subsequent exist into conveyancing tubes 24. In yet other embodiments, exhaust gases may be directed into heat exchangers located in the air tube 52' downstream from fan 26. A valve mechanism 84' may be operated by selectively direct conveyancing air past the heat exchanger.

The present invention, therefore, is directed to using the waste heat of one or more heat sources to heat conveyancing air for a pneumatic distribution system. The result, of course, is a pneumatic conveyancing system which provides much more uniform distribution and much less likelihood of problems due to low temperature, low flow characteristics of oil-based materials or due to moisture from high humidity, moisture in the system lines, or moisture in the substance to be spread.

Thus, numerous characteristics and advantages of the present invention, including numerous embodiments, together with details of structure and function, have been described in the disclosure. It is to be understood, however, that the disclosure is illustrative only. Any changes made, especially in matters of shape, size and arrangement, to the full extent extented by the general meaning of the terms in which the appended claims are expressed, are within the principles of the invention.

What is claimed is:

1. A farm implement for applying a substance onto farmland, comprising:

a self-propelled vehicle, said vehicle including a propulsion engine with a first exhaust pipe;

a container carried by said vehicle for holding a bulk quantity of said substance;

means for distributing said substance, said distributing means including a fan, said fan having an intake for receiving intake gaseous fluid and an outlet for delivering pressurized gaseous fluid, said distributing means further including means for conveying said substance with said pressurized fluid along at least a portion of a path from said container to a distribution ejection device, the pressurized gaseous fluid flowing from said fan outlet to said conveying means;

a source of heat, said source of heat being an engine for driving said fan, said fan engine creating heat, said fan engine having a second exhaust pipe, said fan having an intake portion; and means for heating one of said intake fluid and said pressurized fluid using said heat from said heat source, said heating means including a radiator for cooling water circulating through said engine, said radiator being located adjacent to said fan such that said intake fluid passes through said radiator to get to said fan, said heating means further including one of said first and second exhaust pipes directing heated exhaust gases to an output end located near said intake portion of said fan, whereby said intake gaseous fluid is mixed with and heated by said exhaust gases.

2. A farm implement for applying a substance onto farmland, comprising:

a vehicle;

a container carried by said vehicle for holding a bulk quantity of said substance;

means for distributing said substance, said distributing means including a fan, said fan having an intake for receiving intake gaseous fluid and an outlet for delivering pressurized gaseous fluid, the pressurized gaseous fluid flowing through connecting means from said fan outlet to said conveying means, said distrubuting means further including means for conveying said substance with said pressurized fluid along at least a portion of a path from said container to a distribution ejection device, the pressurized gaseous fluid flowing from said fan outlet to said conveying means;

a source of heat;

means for heating one of said intake fluid and said pressurized fluid using said heat from said heat source, said heating means including a heat exchanger located within said connecting means such that said pressurized gaseous fluid is heated by said heat exchanger as said fluid flows to said conveying means; and means for bypassing said heat exchanger, said connecting means including valve means for directing the pressurized gaseous fluid through one of said heat exchanger and said bypassing means;

whereby the heated fluid aids substance conveyance.

3. A farm implement in accordance with claim 2 wherein said vehicle includes power takeoff means for driving said fan, said implement further including means for actuating said valve means on engagement of said power takeoff means to drive said fan whereby said bypassing means is automatically closed when said fan is operating allowing said pressurized gaseous fluid to flow past said heat exchanger.

4. A farm implement for applying a substance onto farmland, comprising:

a vehicle;

a container carried by said vehicle for holding a bulk quantity of said substance;

means for distributing said substance, said distributing means including a fan, said fan having an intake for receiving intake gaseous fluid and an outlet for delivering pressurized gaseous fluid, said distributing means further including means for conveying said substance with said pressurized fluid along at least a portion of a path from said container to a distribution ejection device, the pressurized gaseous fluid flowing from said fan outlet to said conveying means;

a source of heat including an engine which exhausts hot gases, said engine driving at least one of said vehicle and said fan;

an exhaust pipe for the hot exhaust gases and a branch pipe connected at a first end to said exhaust pipe;

valve means for directing said exhaust gases through one of said exhaust pipe and said branch pipe;

means for heating one of said intake fluid and said pressurized fluid using said heat from said heat source, said heating means including a heat exchanger located to heat one of said intake fluid and said pressurized fluid, said branch pipe being connected at a second end to said heat exchanger, whereby said exhaust gases may be directed through said heat exchanger.

5. A farm implement for applying a substance onto farmland, comprising:

a vehicle;

a container carried by said vehicle for holding a bulk quantity of said substance;

means for distributing said substance, said distributing means including a fan, said fan having an intake for receiving intake gaseous fluid and an outlet for delivering pressurized gaseous fluid, said distributing means further including means for conveying said substance with said pressurized fluid along at least a portion of a path from said container to a distribution ejection device, the pressurized gaseous fluid flowing from said fan outlet to said conveying means;

a source of heat including an engine and an exhaust pipe for hot exhaust gases from said engine, said engine driving at least one of said vehicle and said fan; and means for heating one of said intake fluid and said pressurized fluid using said heat from said heat source, said heating means including a heat exchanger located to heat one of said intake fluid and said pressurized fluid, said heat exchanger being in fluid communication between first and second portions of said exhaust pipe;

whereby the heated fluid aids substance conveyance.

6. A farm implement for applying a substance onto farmland, comprising:

a vehicle;

a container carried by said vehicle for holding a bulk quantity of said substance;

means for distributing said substance, said distributing means including a fan, said fan having an intake for receiving intake gaseous fluid and an outlet for delivering pressurized gaseous fluid, said distributing means further including means for conveying said substance with said pressurized fluid along at least a portion of a path from said container to a distribution ejection device, the pressurized gaseous fluid flowing from said fan outlet to said conveying means;

a source of heat including an engine which exhausts hot gases, said engine driving at least one of said vehicle and said fan;

an exhaust pipe for the hot exhaust gases; and means for heating one of said intake fluid and said pressurized fluid using said heat from said heat source, said heating means including a branch pipe connected at a first end to said exhaust pipe and valve means for directing said exhaust gases through one of said exhaust pipe and said branch pipe, said branch pipe being connected at a second end to said distributing means thereby mixing hot exhaust gases with the pressurized gaseous fluid, said valve means including a cylinder and piston assembly for operating a flapper, said flapper closing one of said exhaust pipe and said branch pipe, said assembly being operated by said pressurized gaseous fluid from said fan;

whereby the heated fluid aids substance conveyance.

* * * * *